United States Patent

Taguchi et al.

Patent Number: 5,563,866
Date of Patent: Oct. 8, 1996

[54] SOUND EDITOR FOR EDITING AUDIO SIGNALS BY RELATING NEW CUTS TO TIME-BASED WINDOWS

[75] Inventors: Kazuma Taguchi, Kanagawa; Tetsuya Kunishige, Tokyo, both of Japan

[73] Assignee: Sony Corporation, Japan

[21] Appl. No.: 339,241

[22] Filed: Nov. 10, 1994

[30] Foreign Application Priority Data

Nov. 15, 1993 [JP] Japan .................................. 5-285385

[51] Int. Cl.$^6$ .................................................. G11B 27/00
[52] U.S. Cl. .................................................. 369/83; 360/13
[58] Field of Search .................................. 369/83, 32, 33, 369/54, 58, 47, 48; 360/13, 14.1

[56] References Cited

U.S. PATENT DOCUMENTS

4,757,540  7/1988  Davis ........................................ 369/83
5,225,945  7/1993  Mine et al. .

Primary Examiner—Georgia Y. Epps
Assistant Examiner—P. W. Huber
Attorney, Agent, or Firm—Ronald P. Kananen

[57] ABSTRACT

In a sound editor, a first editing list is made regardless of the length of a cut and a second editing list for programmed reproduction is thereafter made by retrieving the length of the cuts through a window. When only one cut is found within the window or when a cut is longer than the window, the information concerning the cut is registered in the second editing list as is because no interruption in sound occurs. On the other hands, when a plurality of cuts is found within the window, a new audio material (which is handled together as a single cut from that point on) is recorded. The information about the new cut corresponding to the audio material newly recorded is registered in the second editing list.

9 Claims, 9 Drawing Sheets

| ORDER OF REPRODUCTION | AUDIO MATERIAL | EDITING INFORMATION |
|---|---|---|
| 1 | A1 | CUT (HOURS, MINUTES, SECONDS, FRAME, etc.) |
| 2 | A2 | CUT (HOURS, MINUTES, SECONDS, FRAME, etc.) |
| 3 | A3 | CUT (HOURS, MINUTES, SECONDS, FRAME, etc.) |
| 4 | A4 | CUT (HOURS, MINUTES, SECONDS, FRAME, etc.) |

| ORDER OF REPRODUCTION | AUDIO MATERIAL | REPRODUCTION STARTING TIME AFTER EDITING | TIME OF AUDIO MATERIAL (IN) | TIME OF AUDIO MATERIAL (OUT) |
|---|---|---|---|---|
| 1 | A1 | 0.0 sec | 100 sec | 100.5 sec |
| 2 | A2 | 0.5 | 300 | 301.0 |
| 3 | A3 | 1.5 | 500 | 501.5 |
| 4 | A4 | 4.0 | 800 | 802.0 |
| 5 | A5 | 6.0 | 400 | 404.0 |
| 6 | A6 | 10.0 | 150 | 160.0 |
| 7 | A7 | 21.5 | 550 | 559.0 |
| ⋮ | ⋮ | ⋮ | ⋮ | ⋮ |

F I G. 11

| ORDER OF REPRODUCTION | AUDIO MATERIAL | REPRODUCTION STARTING TIME AFTER EDITING | TIME OF AUDIO MATERIAL (IN) | TIME OF AUDIO MATERIAL (OUT) |
|---|---|---|---|---|
| 1 | Ax | 0.0 sec | 100 sec | 501.5 sec |
| 2 | A4 | 4.0 | 800 | 802.0 |
| 3 | A5 | 6.0 | 400 | 404.0 |
| 4 | A6 | 10.0 | 150 | 160.0 |
| 5 | A7 | 21.5 | 550 | 559.0 |
| ⋮ | ⋮ | ⋮ | ⋮ | ⋮ |

5,563,866

SOUND EDITOR FOR EDITING AUDIO SIGNALS BY RELATING NEW CUTS TO TIME-BASED WINDOWS

BACKGROUND OF THE INVENTION

The present invention relates to a sound editor which edits an audio signal using one or more audio signals as its sound sources.

A audio sound editor which handles only a digital sound signal as its source has been suggested.

Figure 1:
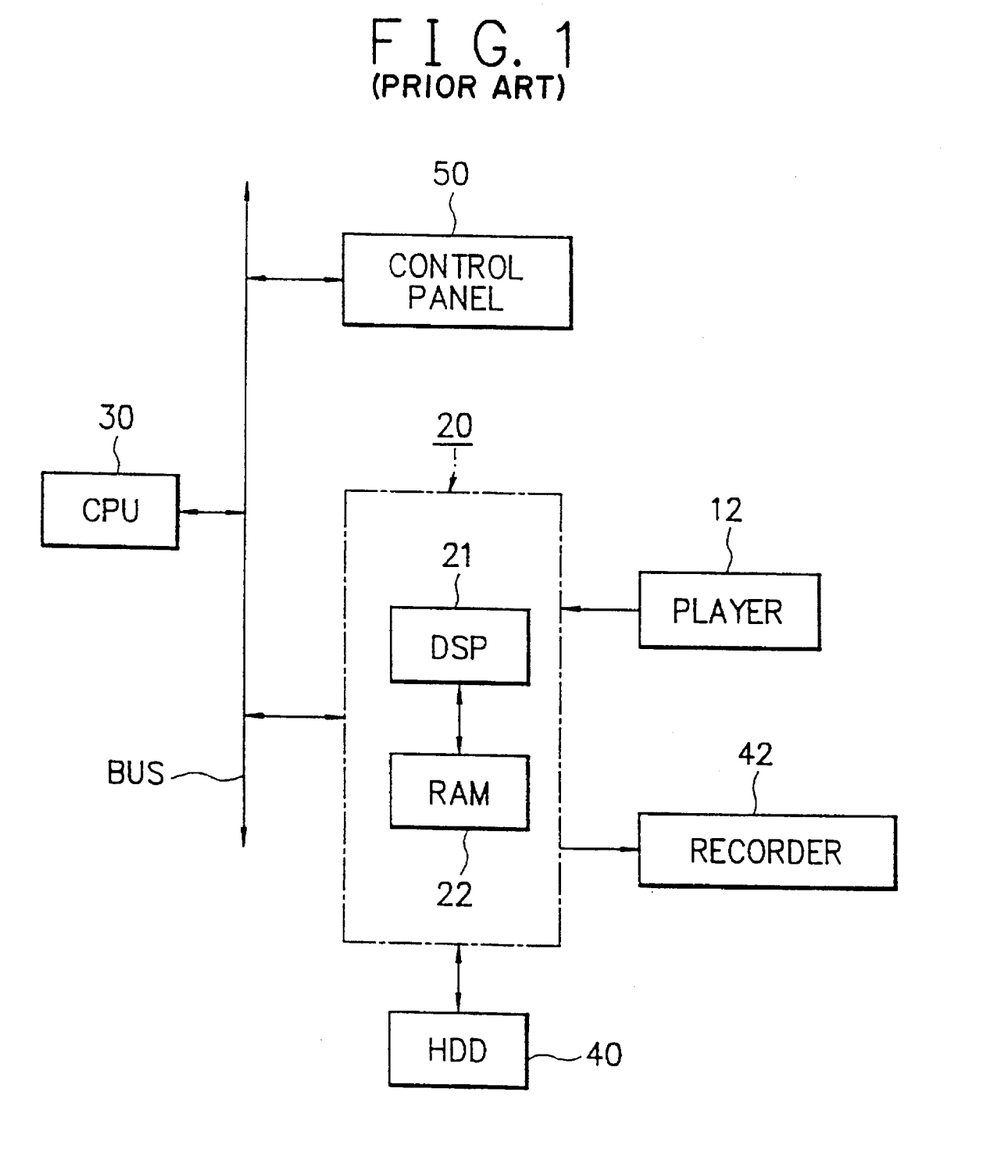
FIG. 1 illustrates, in block diagram form a sound editor as previously proposed.

FIG. 1 illustrates the structure of the main part of such digital sound editor 10. Reference numeral 12 denotes a player such as a MO player, a PCM player, a VCR, a DAT player, or a CD player providing the source, the audio signal of which has been digitally recorded in advance.

The sources have time codes TC pre-recorded together with the digital audio signals. Based on the time code TC, the sound editor 10 allows non-linear editing in which sources can be selected at random.

The player 12 reproduces the sources which may used for editing and which are thereafter recorded as audio material for editing in a hard disk drive (HDD) 40.

Figure 2:
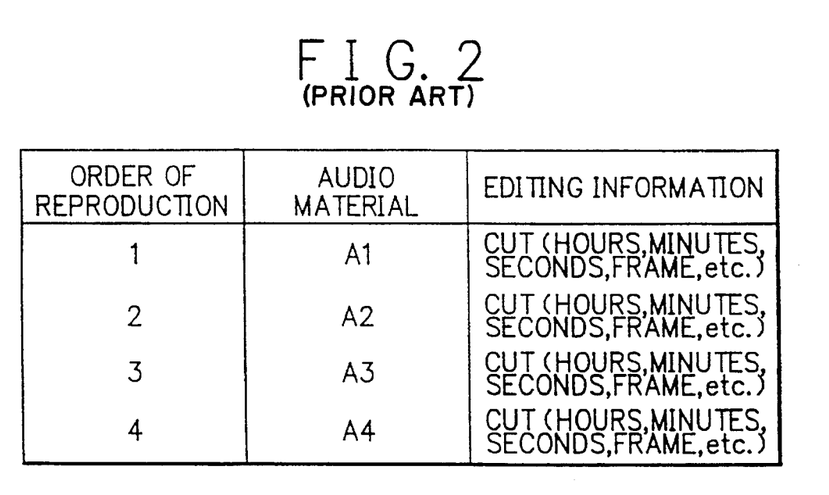
FIG. 2 illustrates an editing list previously proposed.
Figure 3A:
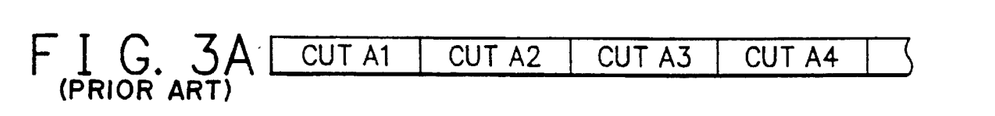
FIGS. 3A and 3B illustrate a process for compiling cuts previously proposed.

FIG. 2 illustrates an example of an editing list which includes editing information such as the order of reproduction, information about the audio material to be used, and cut points. Based on such editing information, an audio signal edited from such cuts can be produced as shown in FIG. 3A.

When performing a programmed reproduction according to the editing list, a DSP (digital signal processor) 20 for processing the audio signals reads from the HDD 40 and performs specific signal processes (filtering, cross-fading and so on). The DSP 20 has a DSP block 21 and a RAM 22 as its working memory as shown in FIG. 1.

The edited audio signal reproduced by the programmed operation is provided to a speaker (not shown) or is recorded by a recording device 42 such as a MO recorder or a PCM recorder. The recorder 42 can also record the editing list together with the audio signal.

Figure 3B:
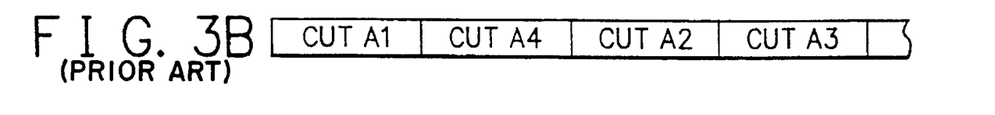

The editing list includes editing points and signal processing information (filtering characteristics, gradient data for cross-fading, and so on). The editing list is used to re-arrange the order of the cuts in FIG. 3A into the order in FIG. 3B.

In the editing operation, a reproduction based on the editing list (a programmed reproduction) is repeated and checked, until a final editing list is produced, at which point the editing operation is completed. In the editing list, the cross-fading process is performed for every cut in real time simultaneously with editing and verification, and at such time, the problem described below occurs.

The non-linear editing includes an operation for replacing a single sound. For instance, it is necessary to replace a sound (or some sounds) with another (or others) when the sound from the source is off pitch or is accidentally mixed with noise in a fragment of time. In this case, the length of the cut to be edited may be extremely short.

Figure 4:
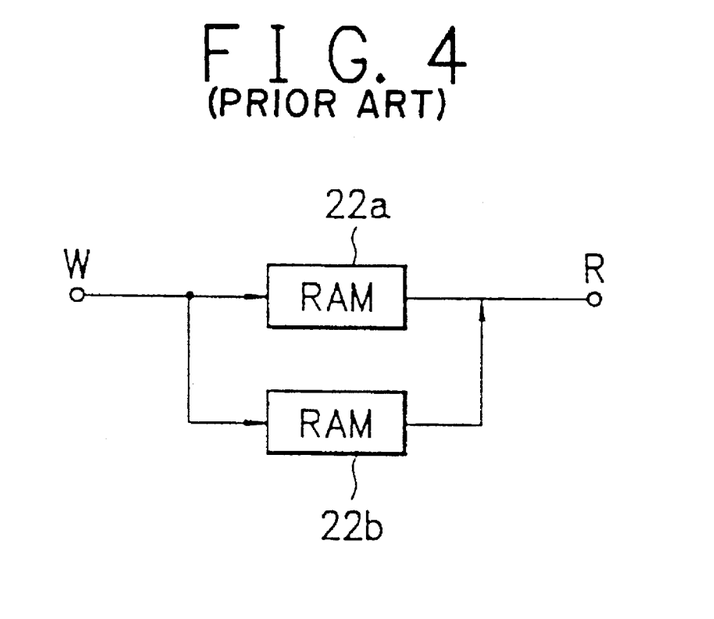
FIG. 4 illustrates, in block diagram form, a DSP memory previously proposed.

Referring to FIG. 4, when two RAMs 22a and 22b are used as the DSP memory 22, a read operation and a write operation are performed alternately. When instructed to access a specific cut, that cut is read from the HDD 40 and the next cut must be accessed prior to the time the first cut has been completely written into the RAM 22a or 22b; thus, the file information just prior to the next cut cannot be totally recorded.

Minimum time T(msec.) is the time that is required for the memory process for the HDD, and so forth, starting form the time the access is begun, the data is written in using a different memory process and the writing is completed, until it is possible to begin the next process, together with a little leeway.

Figure 5:
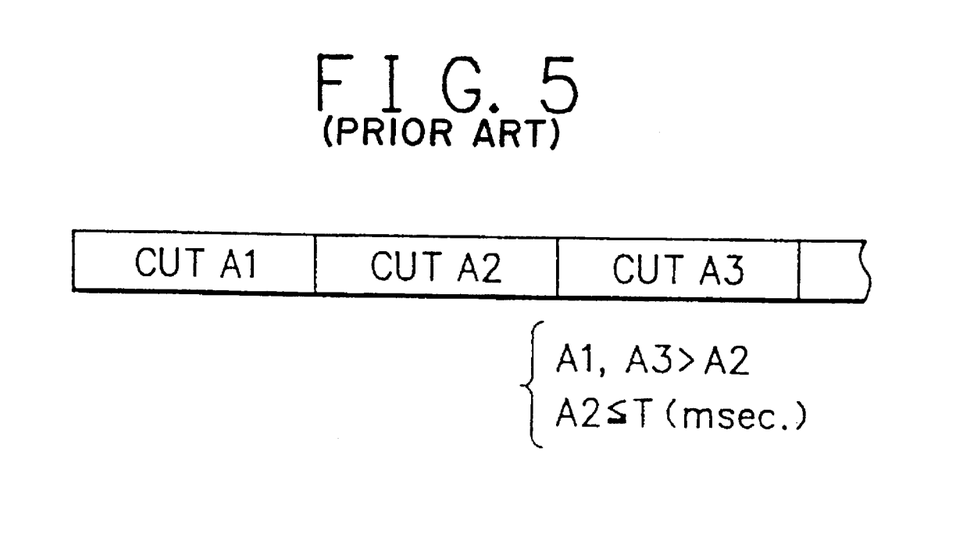
FIG. 5 illustrates the editing list for programmed reproduction previously proposed.

Referring to FIG. 5, when the length (time) of a cut A2 is below the minimum time T (300 msec. to 2 sec. in general), the cut A2 cannot be recorded correctly because the access to the cut A3 starts before cut A2 is entirely recorded. In this way, the editing operation is not completely performed and an interruption in sound results. Such interruption in sound often occurs in the editing operation for replacing a single sound.

SUMMARY OF THE INVENTION

In accordance with one aspect of the present invention, in the sound editor, a first editing list ("main list") is made at first regardless of the length of a cut, and a second editing list ("hidden list") is thereafter made by retrieving the length of the cut through a window. If necessary, a group of cuts is recorded together as a new cut. The second editing list is used for the programmed reproduction. When only one cut is found within the window or when a cut is longer than the window, the information about the cut is registered in the second editing list as is because no interruption in sound occurs. On the other hand, when a plurality of cuts is found within the window, a new audio material (which is handled together as one cut from that point on) is recorded. In addition, the information about the new cut corresponding to the audio material newly recorded is registered in the second editing list. That is to say, the process differs depending on the length of the cut. Only when a plurality of cuts is found within the window, are the cuts registered together as one new cut in the second editing list and the programmed reproduction is performed based on such second editing list, Thus, the editing operation is performed without such an interruption in sound.

It is accordingly an object of the invention to provide a sound editing apparatus and a sound editing system for editing sound without the interruption in sound.

The concluding portion of this specification particularly points out and distinctly claims the subject matter of the present invention. However, those skilled in the art will best understand both the organization and method of operation of the invention, together with further advantages and objects thereof, by reading the following description in view of the accompanying drawings wherein like reference characters refer to like elements.

DETAILED DESCRIPTION OF THE PREFERRED EMBODIMENT

A preferred embodiment of the present invention will now be described with reference to the accompanying drawings. In this embodiment, a digital audio sound editor is used as an example of a sound editor according to the invention.

Figure 6:
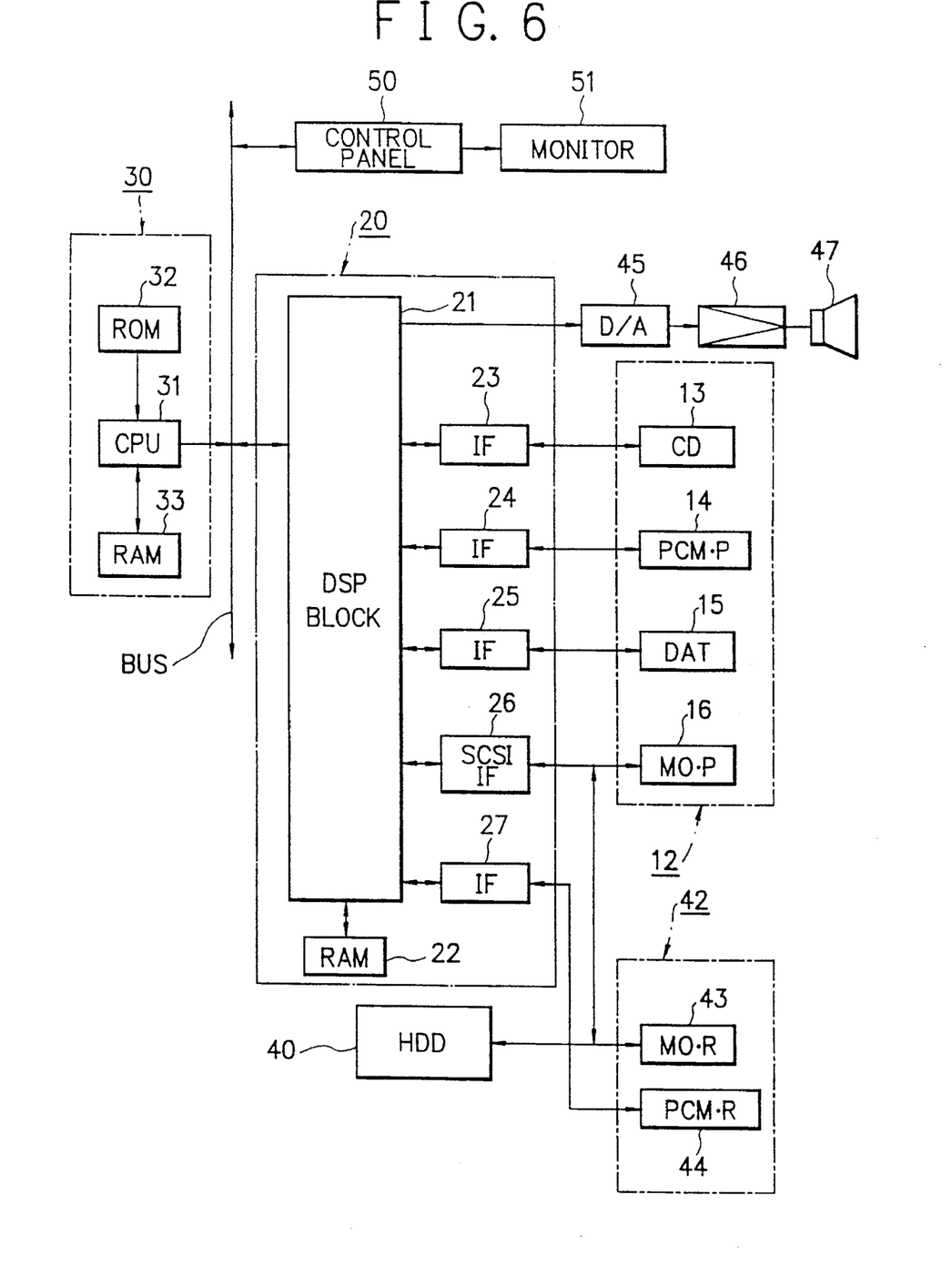
FIG. 6 illustrates, in block diagram form, a sound editor in accordance with the present invention.

FIG. 6 is a general view of the sound editor according to the invention. A CD player 13, a PCM player 14, and a DAT player 15 are used as players 12, although there may be a large number of different kinds of players.

A DSP 20 has a DSP block 21, a RAM 22 as its working memory, and interfaces 23 to 27. Audio signals reproduced from each of the players 13, 14 and 15 are supplied via the SCSI interface 26 to a hard disk drive (HDD) 40 which is an audio material storage means 40 for the purpose of making the editing list. An audio signal reproduced from the MO player 16 is supplied, via the SCSI interface 26, to the HDD 40.

A controller 30 has a CPU 31, a control ROM 32 which stores a control program and a program for making an editing list for programmed reproduction, and a memory (RAM) 33 which stores the editing list temporarily. The editing list is recorded in the HDD 40.

An MO recorder 43 and a PCM recorder 44 are used as recorders 42 for recording the edited audio signal, although there could be many other examples. Data are transmitted through the SCSI bus between the MO player 16, the MO recorder 43, and the HDD 40. Data for the PCM recorder 44 are transmitted through the interface 27.

The audio signal, filtered or cross-faded by the DSP block 21, is recovered as an analog signal by a D/A converter 45, and the audio signal before and after being edited is monitored through an amplifier 46 and a speaker 47.

The editing list is displayed on a monitor (CRT or liquid crystal panel) 51. The monitor 51 can additionally display envelopes of the audio signal and a cursor used for editing.

Before making the editing list, sources which are possibly used as audio material are reproduced from the player 13, 14, and 15, and are recorded in the HDD 40. An editing list is made based on the audio material recorded in the HDD 40.

The manner of making the editing list for the programmed reproduction by such systemized sound editor 10 is described below.

The first editing list ("main list") is made regardless of the length of a cut, and the second editing list ("hidden list") is made by retrieving each cut through a window W. If necessary, a group of cuts is recorded together as a new cut. The second editing list is used for the programmed reproduction. The length of the window W is set to a minimum time T.

A length of cut is retrieved through the window W. The process of making the second editing list differs depending on the length of the cut.

(A) When only one cut is found within the window W or when a cut has a length greater than the length of the window W, as shown in FIG. 7, the information about the cut is registered in the second editing list as is because no interruption in sound occurs.

Figure 7A:
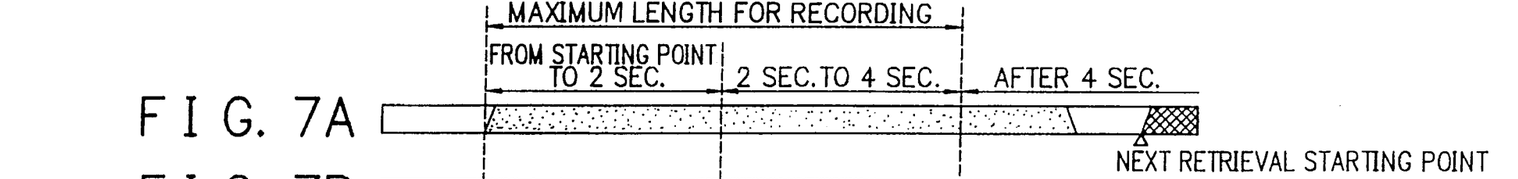
FIGS. 7A–7G illustrate the example of a process for retrieving cuts through a window.
Figure 7B:
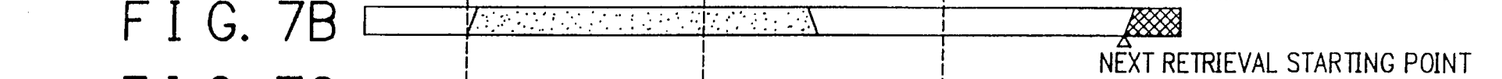
Figure 7C:
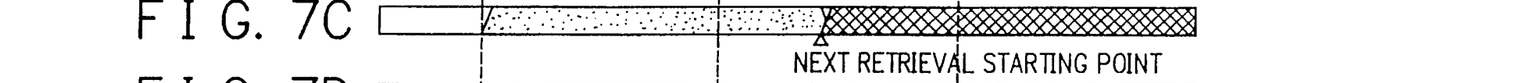
Figures 7D, 7E:
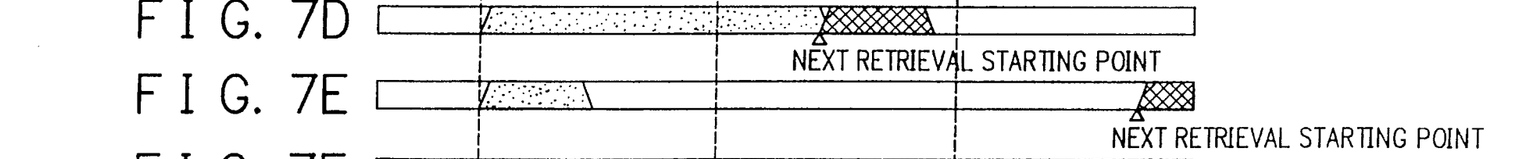
Figure 7F:
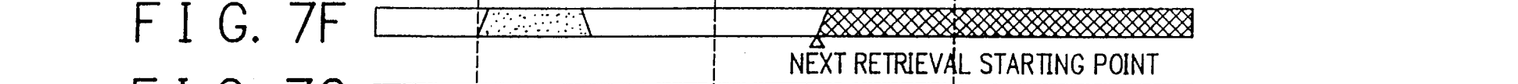
Figure 7G:
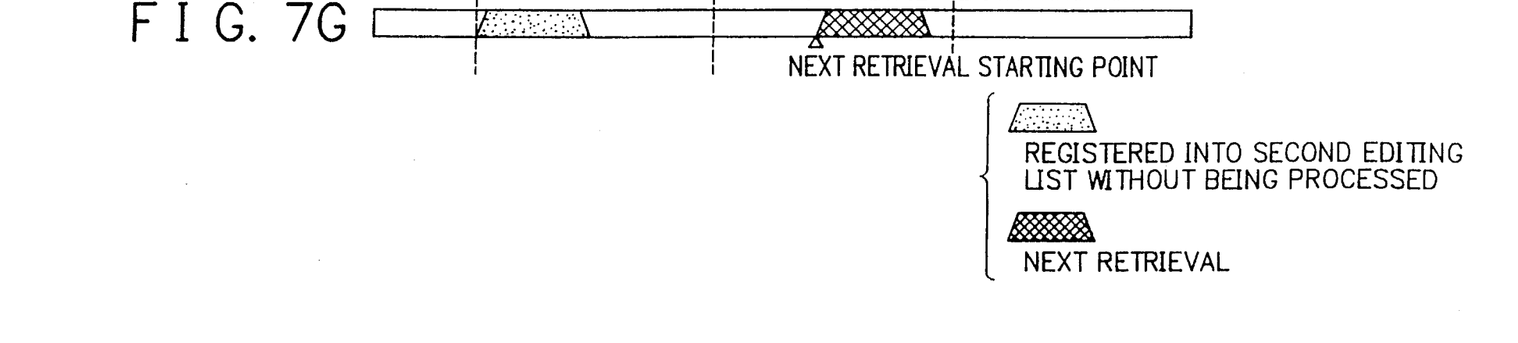

FIG. 7A to 7D show examples in which the cuts are longer than the window W, while FIG. 7E to 7G show examples in which the cuts are shorter than the window W. Because the lengths of all of these cuts are longer than the minimum time T as measured from the first retrieval starting point to the next retrieval starting point, the information about the cuts in the first editing list is registered in the second editing list as is, regardless of the position of the next retrieval starting point.

(B) When a plurality of cuts is found within the window W, a new audio material (which is handled together as one cut from that point on) is recorded. In addition, the information about the new cut corresponding to the audio material newly recorded is registered in the second editing list. That is to say, the process differs depending on the length of the cut.

Figure 8A:
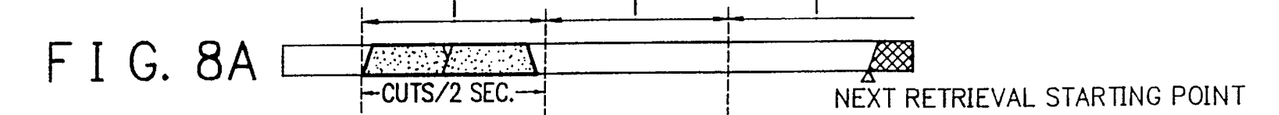
FIGS. 8A–8G illustrate another example of the process for retrieving cuts through a window.
Figures 8B, 8C, 8D:
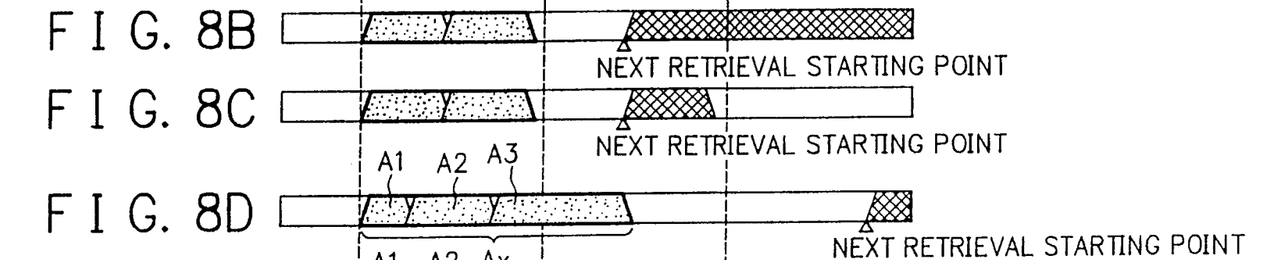
Figure 8E:
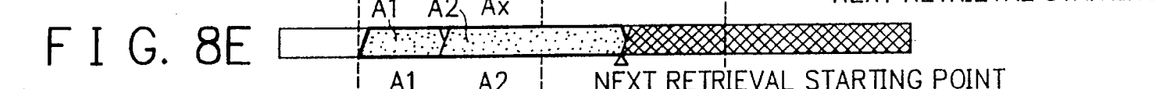
Figure 8F:
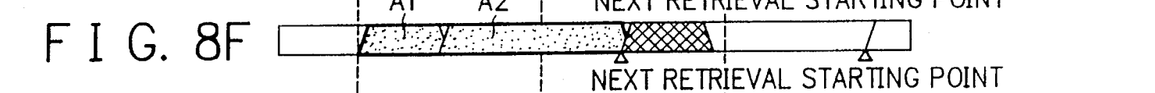

(B1) When the time measured from the starting point to the ending point of a plurality of cuts is less than twice the amount of the time for the window W, as shown in FIG. 8E, and 8F (drawn with a heavy line), all audio signals from the starting point to the ending point of the cuts (A1, A2, and A3 shown in FIG. 8D, and A1 and A2 shown in FIG. 8E and 8F) are recorded together as new audio material Ax in the HDD 40. At that time, the information about the new cut corresponding to the audio material Ax newly recorded is registered in the second editing list.

In addition, in the case of FIG. 8D, because the cuts A1 and A2 are short, the interruption in sound occurs when recording the cuts A2 and A3 after the cuts A1 and A2. To prevent this, after recording a cut synthesized from the cut A1 and A2, a new audio material synthesized from this cut and the cut A3 is recorded in the HDD 40.

Such process is performed each time the total time, from the starting point to the ending point, of a plurality of cuts is within the length of time of the window W, as shown in FIG. 8A, 8B and 8C.

Figure 8G:
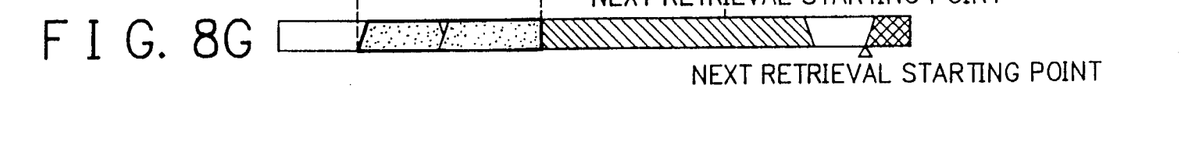

(B2) When the time measured from the starting point to the ending point of a plurality of cuts is more than twice the length of time for the window W, as shown in FIG. 8G, a cut corresponding to the time measured from the starting point of the cuts to the end of the window W is recorded as new audio material Ax in the HDD 40. At that time, the information about the audio material Ax newly recorded which has a length equal to the length of the window W is registered in the second editing list, and information about the remaining cuts which extend beyond the length of the window W (drawn with a oblique line in FIG. 8G) is registered as another new cut in the second editing list. This cut of the audio material is not recorded in the HDD 40 because has been already recorded. In other words, since all cuts of a length exceeding twice the length of the window W can be newly recorded in the HDD 40, it is necessary to enlarge the capacity of the HDD 40. In this embodiment, only the cuts within the length of the window W are recorded as new audio material, thereby allowing the capacity needed for the HDD 40 to be reduced.

If all cuts exceeding twice the length of the window W are newly recorded in the HDD 40, the time necessary for recording the cuts is increased, thereby increasing the time necessary for making the second editing list. This embodiment allows the time for making the second editing list to be reduced.

In addition, in this embodiment, it is possible to use an audio signal closer in quality to the original than in the above case and to prevent the audio signal from deteriorating in sound quality.

As described above, when a plurality of cuts is found within the minimum time T, all of them are recorded as a new cut in the HDD 40. Even if the first editing list is as described in case (B), it is possible to edit sounds without an interruption in sound while performing the programmed reproduction from the second editing list, because each cut has a length above the minimum time T.

Figures 9A, 9B:
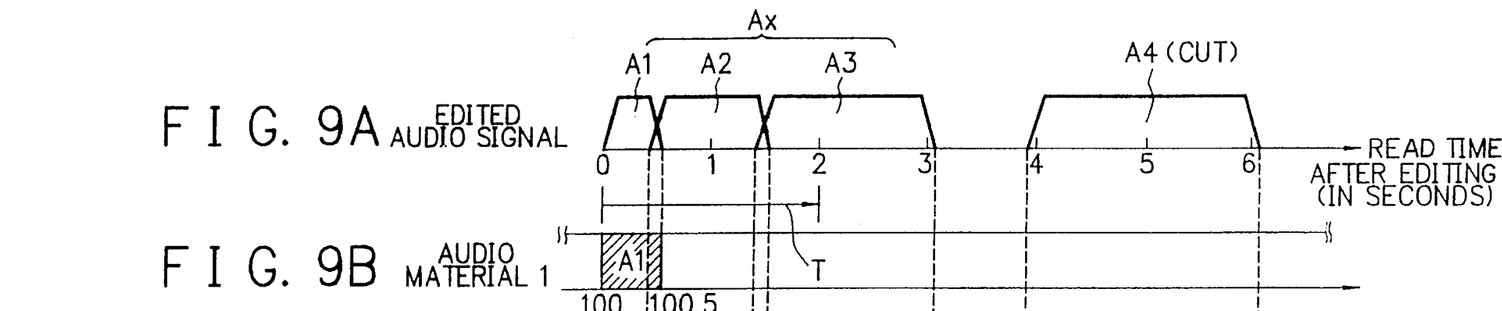
FIGS. 9A–9E illustrate the edited audio signal.
Figure 9C:
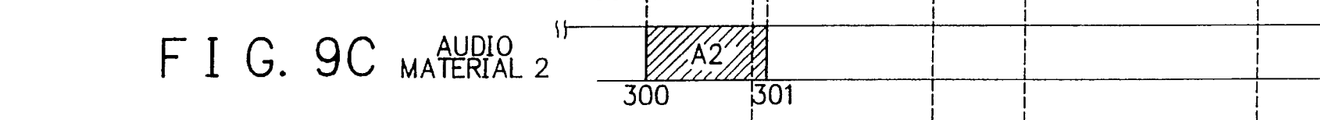
Figures 9D, 9E:
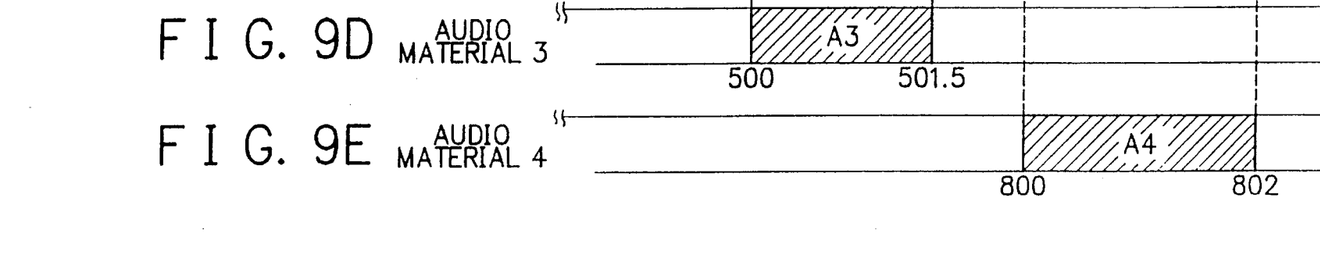

FIG. 9 shows a concrete example of this in the case of FIG. 8D. In this example, the audio signal shown in FIG. 9A is compiled from cuts which were edited out from four pieces of audio materials indicated by the reference numbers 1 to 4 (shown in FIG. 9B to 9E). The axis of abscissas in FIG. 9A corresponds to real time, in other words, time codes used in the recorder which records the edited audio signal.

The period from 100 sec. to 100.5 sec. in the time codes of the audio material 1 is used as a cut A1, for which the real time is from 0.0 sec. to 0.5 sec. The period from 300 sec. to 301 sec. in the time codes of the audio material 2 is similarly used as a cut A2, for which the real time is from 0.5 sec. to 1.5 sec. The period from 500 sec. to 501.5 sec. in the time codes of the audio material 3 is similarly used as a cut A3, for which the real time is from 1.5 sec. to B sec.

In addition, the period from 800 sec. to 802 sec. in the time codes of audio material 4 is used as a cut A4, for which the real time is from 4 sec. to 6 sec. There is accordingly no sound between cuts A3 and A4.

Figure 10:
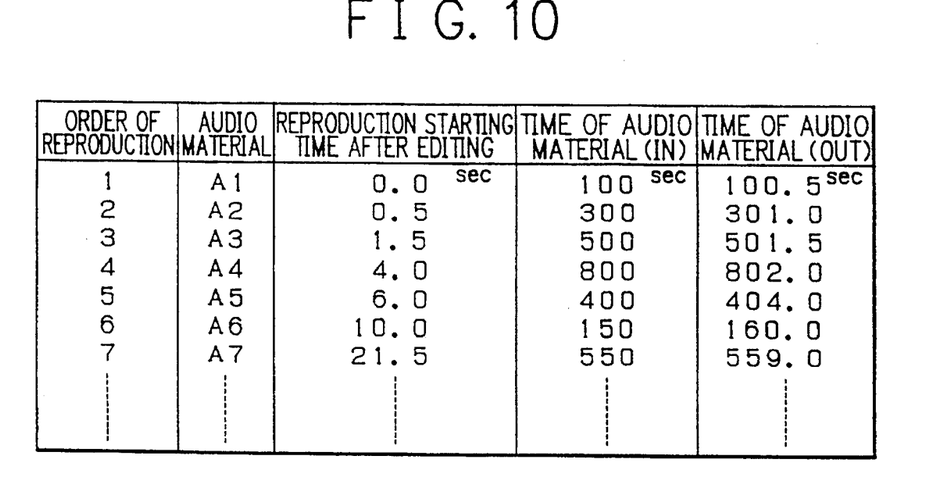
FIG. 10 illustrates a first editing list.
Figure 11:
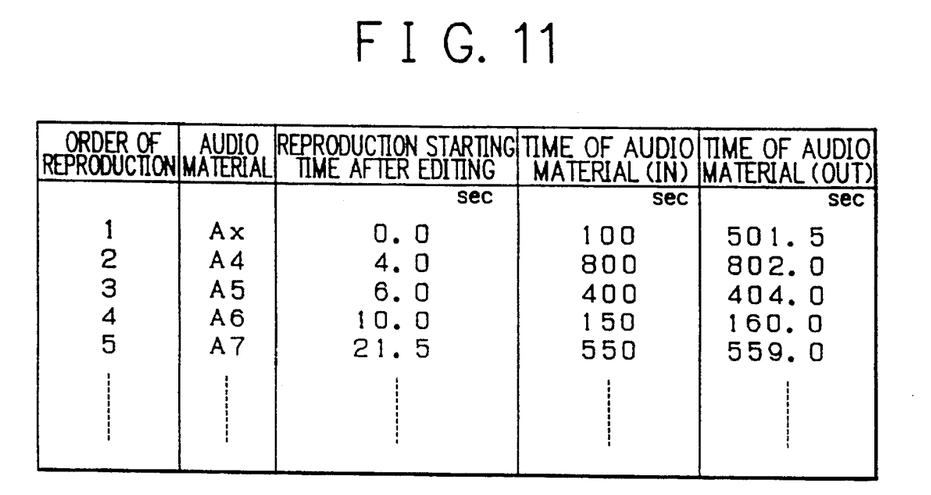
FIG. 11 illustrates a second editing list.

FIG. 10 shows the first editing list in accordance with FIG. 9 and includes, for reasons of convenience, a cut A5 which is not shown in FIG. 9. In FIG. 10, within the window W, there are three cuts for which the starting points are at 0 in real time, and the ending point of the last cut is less than double the length of within twice the window W. In this case, all of the cuts A1 to A3 are recorded together as a new audio material Ax in the HDD 40. The second editing list, shown in FIG. 11 is made in this process.

Figure 12:
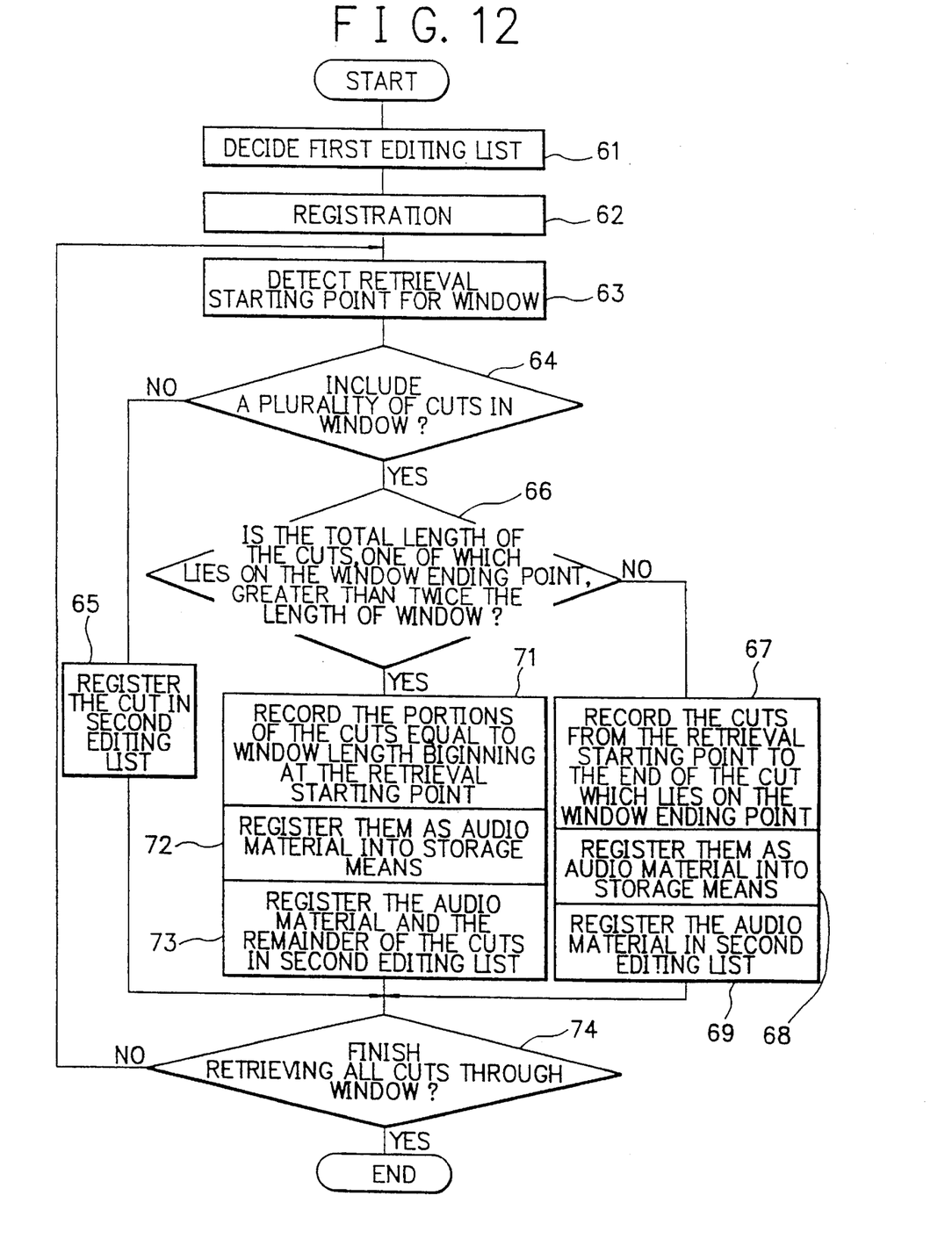
FIG. 12 is the flow chart illustrating the operation for making the first editing list.

This process will be described below in reference to the flow chart in FIG. 12. In step 61, a operator makes the first editing list, which is thereafter registered by operating a save key which is not shown (in step 62).

After registering the first editing list, the process of making the second editing list begins. The retrieval starting points are detected (in step 63). This process determines the head position of each cut.

When a plurality of cuts is not found within the window W (in step 64), in other words, when only one cut is found within the window W or when a cut which is greater in length than the length of the window W is found, the information relating to such cut from the first editing list is registered in the second editing list as is (in step 65).

On the other hand, when a plurality of cuts is found within the window W (in step 64), the flow proceeds to step 66, where the length of one of the cuts which extends beyond the ending point of the window W is measured. In the case of FIG. 8D, based on the measured length of the cut A3, it is determined whether the total length of the cuts including the cut A3 is greater than twice the length of the window W as measured from the retrieval starting point.

When such length is less than twice that of the window W, the flow proceeds to step 67, where all of the cuts which begin with the retrieval starting point and extend beyond the ending point of the window W to their out points are recorded together as a single cut or single piece of audio material. This record compiles the corresponding cuts (A1, A2 and A3 in FIG. 8D) which are read from the HDD 40 and records them in another area in the HDD 40 (in step 68). At the same time, the information concerning the cuts is registered in the second editing list (in step 69).

In step 66, when the length of the plurality of cuts is greater than twice the length of the window W as measured from the retrieval starting points, the flow proceeds to step 71, where the portions of the cuts equal in length to the length of the window W are recorded as a new audio material (cut). Such cuts correspond to that portion, the border of which is drawn by a heavy line in FIG. 8G. The cuts newly recorded are registered in the HDD 40 (in step 72).

The information concerning the new cut is registered in the second editing list and the information concerning the remaining cuts (drawn by dashed oblique lines in FIG. 8G) is also registered (in step 73). Such process is performed for all cuts, and at this point the process of making the second editing list is completed (in step 74).

As described above, in the present invention, the first editing list is made regardless of the lengths of the cuts. The second editing list is thereafter made by pulling the lengths of the cuts through a window, and is used in the programmed reproduction. As a result of such retrieving, when it is necessary to make a new cut, the cut is recorded as a new audio material and its contents are registered in the second editing list.

When more than two cuts are found within the window W, they are recorded together as a new cut, which is the audio material for one cut in the programmed reproduction. Because such new cut has a length equal to the minimum time described above, the sound editing can be performed without the interruption in sound.

When the operator requests a programmed reproduction, the programmed reproduction is performed based on the second editing list without any interruption in sound.

The monitor 51 displays not the second editing list but the first editing list. So the operator can easily confirm the editing condition using the displayed list which is made by the operator himself.

Further, though the HDD 40 is used for the storage means in the embodiment, this invention is more advantageous if an optical disk drive, for which access is slower than that for a HDD, is used for the storage means.

What is claimed is:

1. A sound editing apparatus for producing a new audio signal by editing a plurality of cuts from a plurality of audio signals, comprising:

first editing list making means for making a first editing list which includes the plurality of cuts;

detection means for detecting in said first editing list made by said first editing list making means whether or not the plurality of cuts are included within a window period which has a predetermined time as measured from the starting point of a cut or to the ending point of a cut;

storage means; and second editing list making means for editing audio signals at least within said window period, for recording said audio signals as a new cut in said storage means, and for making a second editing list for programmed reproduction including said new cut, when said detection means detects the plurality of cuts are included within said window period.

2. The sound editing apparatus according to claim 1 wherein said detection means detects whether or not the length of time, measured from the starting point of the plurality of said cuts to the ending point of the plurality of said cuts is greater than twice the length of said predetermined time when the plurality of cuts are included within said window period, and said second editing list making means records the audio signal corresponding to the time measured from the starting point of the plurality of said cuts to the ending point of said window period as said new cut, when the time measured from the starting point of the plurality of said cuts to the ending point of the plurality of said cuts is greater than twice said predetermined time.

3. The sound editing apparatus according to claim 2 wherein said second editing list making means records the audio signal corresponding to the time measured from the starting point of the plurality of said cuts to the ending point of the plurality of said cuts as said new cut when the length of time measured from the starting point of the plurality of said cuts to the ending point of the plurality of said cuts is less than twice said predetermined time.

4. A method for producing a new audio signal by editing a plurality of cuts from a plurality of audio signals, comprising the steps of:

(a) making a first editing list which includes the plurality of cuts;

(b) detecting in said first editing list made by said first editing list making means whether or not the plurality of cuts are included within a window period which has a predetermined time as measured from a starting point of a cut or to an ending point of a cut;

(c) editing the audio signals at least within said window period, recording the audio signals as a new cut in a storage means, and making a second editing list for programmed reproduction including said new cut, when detecting the plurality of said cuts within said window period in said step (b).

5. The method according to claim 4 further comprising the steps of:

detecting whether or not the length of time measured from the starting point of the plurality of said cuts to the ending point of the plurality of said cuts is greater than twice said predetermined time in said step (c); and recording the audio signal corresponding to the time measured from the starting point of the plurality of said cuts to the ending point of said window period as said new cut when the length of time measured from the starting point of the plurality of said cuts to the ending point of the plurality of said cuts is greater than twice said predetermined time.

6. The method according to claim 5 recording the audio signal corresponding to the length of time measured from the starting point of the plurality of said cuts to the ending point of the plurality of said cuts as said new cut when the length of time measured from the starting point of the plurality of said cuts to the ending point of the plurality of said cuts is less than twice said predetermined time in said step (c).

7. A sound editing system for producing a new audio signal by editing a plurality of cuts from a plurality of audio signals, comprising:

source means for reproducing the plurality of audio signals;

first editing list making means for making a first editing list which includes the plurality of cuts;

detection means for detecting in said first editing list made by said first editing list making means whether or not the plurality of cuts are included within a window period which has a predetermined time measured from the starting point of a cut or to the ending point of a cut;

storage means;

second editing list making means for directing said source means to reproduce audio signals within said window period and for recording the audio signals as a new cut in said storage means when detecting the plurality of cuts within said window period, and for making a second editing list including said new cut;

recording means; and control means for editing the audio signals reproduced by said source means and for directing said recording means to record said reproduced audio signals on the basis of said second editing list.

8. The sound editing system according to claim 7 wherein said detection means detects whether or not the length of time measured from the starting point of the plurality of said cuts to the ending point of the plurality of said cuts is greater than twice said predetermined time when the plurality of cuts are included within said window period, and said second editing list making means records the audio signal corresponding to the time measured from the starting point of the plurality of said cuts to the ending point of said window period as said new cut, when the length of time measured from the starting point of the plurality of said cuts to the ending point of the plurality of said cuts is greater than twice said predetermined time.

9. The sound editing system according to claim 8 wherein said second editing list making means records the audio signal corresponding to the length of time measured from the starting point of the plurality of said cuts to the ending point of the plurality of said cuts as said new cut when the length of time measured from the starting point of the plurality of said cuts to the ending point of the plurality of said cuts is less than twice said predetermined time.

* * * * *